United States Patent [19]
Brown et al.

[11] Patent Number: 6,073,065
[45] Date of Patent: Jun. 6, 2000

[54] METHOD FOR DETECTING A BANK ANGLE EXPERIENCED BY A MOVING VEHICLE

[75] Inventors: Todd Allen Brown, Dearborn; Hongtei Eric Tseng, Canton, both of Mich.

[73] Assignee: Ford Global Technologies, Inc., Dearborn, Mich.

[21] Appl. No.: 09/148,766

[22] Filed: Sep. 4, 1998

[51] Int. Cl.[7] ................................................ G06F 7/00
[52] U.S. Cl. ............................. 701/36; 701/6; 701/72; 701/79; 244/179
[58] Field of Search ........................... 701/6, 36, 45, 701/46, 65, 70, 72, 80, 94; 244/179, 184, 185

[56] References Cited

U.S. PATENT DOCUMENTS

| | | | |
|---|---|---|---|
| 3,809,867 | 5/1974 | Hattendorf | 701/4 |
| 4,679,808 | 7/1987 | Ito et al. | 701/1 |
| 4,690,431 | 9/1987 | Ito et al. | 280/771 |
| 4,761,022 | 8/1988 | Ohashi et al. | 280/5.504 |
| 4,788,773 | 12/1988 | Palsgard et al. | 33/333 |
| 4,809,181 | 2/1989 | Ito et al. | 701/41 |
| 4,872,116 | 10/1989 | Ito et al. | 701/41 |
| 5,058,017 | 10/1991 | Adachi et al. | 701/38 |
| 5,060,889 | 10/1991 | Nadkarni et al. | 244/183 |
| 5,123,497 | 6/1992 | Yopp et al. | 701/48 |
| 5,311,956 | 5/1994 | Sugiyama | 701/41 |
| 5,446,658 | 8/1995 | Pastor et al. | 701/1 |
| 5,627,756 | 5/1997 | Fukada et al. | 701/70 |
| 5,654,906 | 8/1997 | Youngquist | 701/14 |
| 5,707,117 | 1/1998 | Hu et al. | 303/122.08 |

Primary Examiner—William A. Cuchlinski, Jr.
Assistant Examiner—Gertrude Arthur
Attorney, Agent, or Firm—Gregory P. Brown

[57] ABSTRACT

A method for detecting a bank angle experienced by a motor vehicle (10) is disclosed. Three estimates of the vehicle bank angle, $\hat{\gamma}_a$, $\hat{\gamma}_\omega$ and $\hat{\gamma}_v$, are determined from separate data and are then used to determine an estimate of the bank angle BIAS. The bank angle BIAS is then combined with one of the three bank angle estimates to determine a final bank angle estimate, $\hat{\gamma}_{final}$, to be used to modify the vehicle's yaw control calculations in accordance therewith.

18 Claims, 2 Drawing Sheets

METHOD FOR DETECTING A BANK ANGLE EXPERIENCED BY A MOVING VEHICLE

BACKGROUND OF THE INVENTION

1. Field of the Invention

The present invention relates generally to a method of detecting a bank angle being experienced by a moving vehicle. More particularly, the present invention relates to a method for detecting the bank angle under dynamic lateral operating conditions for use in a motor vehicle yaw having a control system.

2. Disclosure Information

Automotive vehicles with braking systems which respond to vehicle conditions as well as driver input have been produced. For example, when a particular yaw rate is desired, as indicated by a driver's steering wheel operation, if the vehicle is not producing an adequate yaw rate, the braking system of the vehicle may compensate by altering a particular wheel's speed. This control is dependent on accurate measurement of several vehicle operating conditions. It had been observed that error can be introduced in the control system if the vehicle is operating at a bank angle. Therefore, it is desirable to determine the bias in the various operating condition signals introduced by operating at a bank angle.

U.S. Pat. No. 5,446,658 ('658) addresses the problem of estimating bank angles of a road surface. However, under various operating conditions, the system described in '658 patent does not have the ability to calculate the road surface bank angle under dynamic lateral operating conditions. Specifically, if the yaw rate for the vehicle changes by more than a predetermined threshold, the previously determined bank angle is assumed as the current bank angle. Of course, it is quite possible for a vehicle to undergo extreme bank angle variation during the period that the yaw rate is not within a predetermined threshold.

It would be desirable to provide a method for determining a bank angle being experienced by a motor vehicle that is robust to dynamic lateral vehicle operating conditions.

SUMMARY OF THE INVENTION

There is disclosed herein a method for detecting a bank angle experienced by a motor vehicle. The method comprises the steps of:

a.) providing a first signal corresponding to a lateral acceleration of the vehicle;

b.) calculating a first bank angle estimate dependent on the first signal;

c.) providing a second signal corresponding to a yaw rate of the vehicle;

d.) calculating a second bank angle estimate dependent on the second signal;

e.) calculating a third bank angle estimate dependent on both the first and second signals;

f.) calculating a bank angle bias estimate based on the first, second and third bank angle estimates; and g.) calculating a final bank angle estimate as a function of the third bank angle estimate and the bank angle bias.

It is an object of the present invention to provide a method for detecting a bank angle experienced by a vehicle while undergoing transient lateral operation.

DETAILED DESCRIPTION OF THE PREFERRED EMBODIMENT

Figure 1:
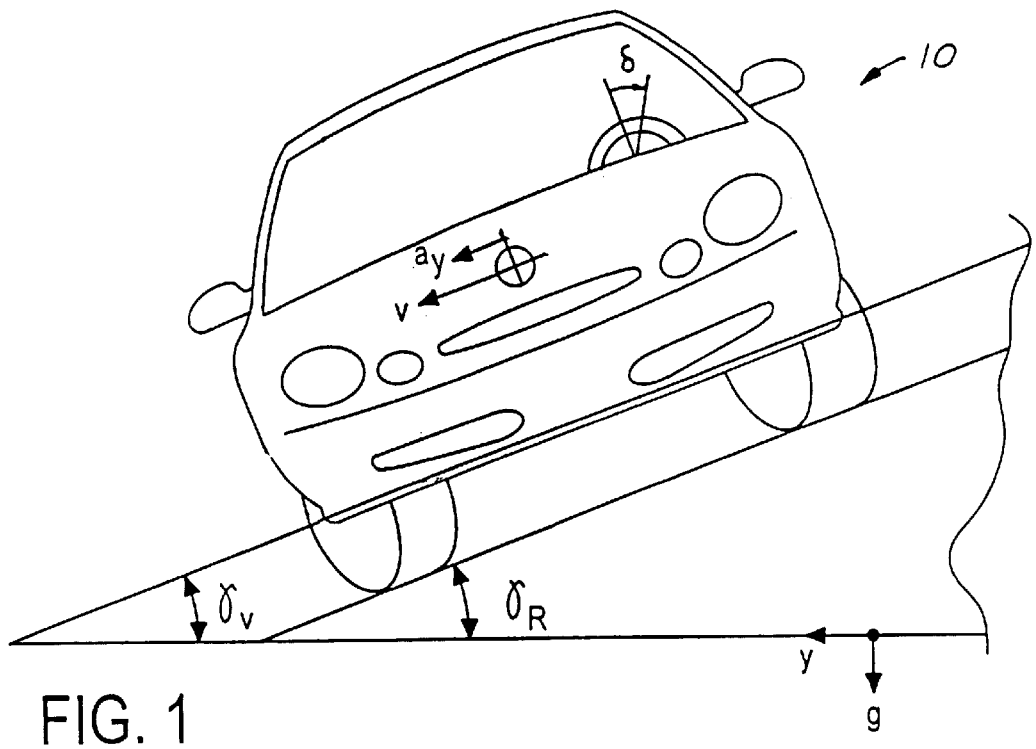
FIG. 1 is a front view of a motor vehicle illustrating various operating parameters of a vehicle experiencing a turning maneuver on a banked road surface.
Figure 2:
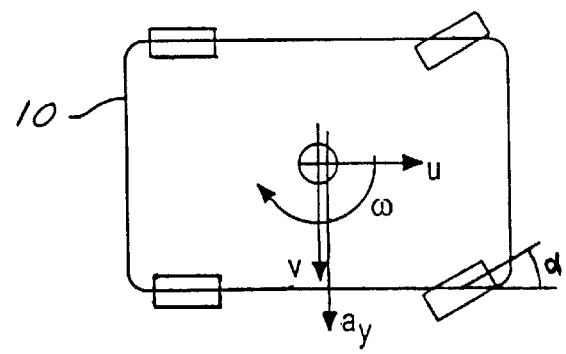
FIG. 2 is a top view of a motor vehicle illustrating various operating parameters of a vehicle experiencing a turning maneuver on a banked road surface.

A method according to the present invention is intended for use with yaw control systems which are typically implemented with electronically controlled hydraulically actuated or electrically actuated braking systems in automotive vehicles, however, the invention could easily be adapted for use in yaw control systems on other motor vehicles, such as watercraft and aircraft as well as on other vehicle systems, such as active tilt or active suspension where it would be desirable to know the underlying road bank angle. Referring now to FIGS. 1 and 2, various operating parameters and variables used by the present invention are illustrated as they relate to the application of the present invention to a ground based motor vehicle 10. Those skilled in the art will immediately recognize the basic physics represented by these illustrations, thereby make the adaptation to different types of vehicles easily within their reach. These parameters will be described in greater detail below.

Figure 3:
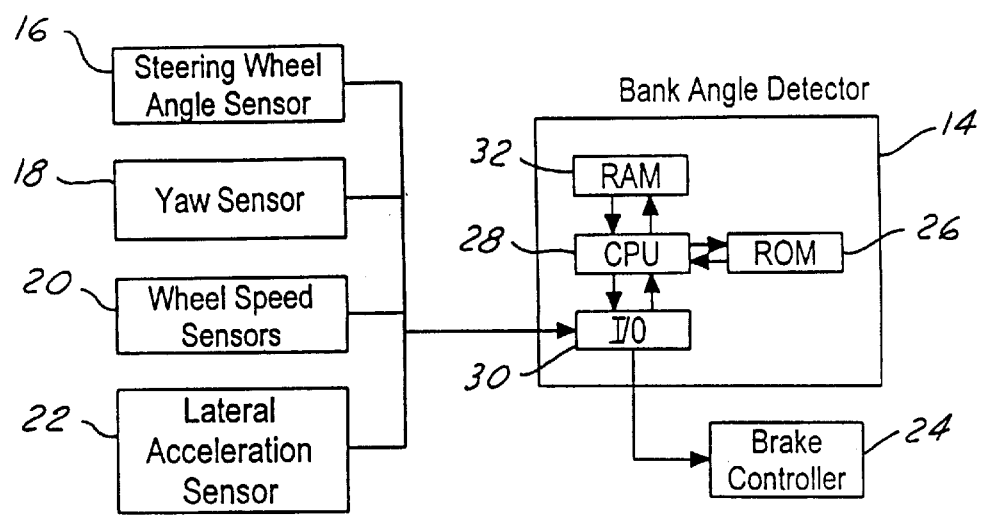
FIG. 3 is a block diagram showing a portion of a microprocessor interconnected to sensors and controlled devices which may be included in a system according to the present invention.

FIG. 3 illustrates the component parts of a system in which the the present invention has been implemented successfully. Accordingly, a control module 14 receives inputs from steering wheel angle sensor 16, yaw sensor 18, wheel speed sensors 20 and lateral acceleration sensor 22. Although not illustrated, other sensors and accelerometers could be employed in addition to, or as substitutes for those illustrated, depending upon the system being controlled and the available system sensor set while still making use of the present invention. As an example, the present invention could be carried out with equivalent operability and functionality using data to generate estimates of yaw rate and lateral acceleration if the cost, complexity or other considerations made it worthwhile to eliminate the actual sensors.

As previously noted, an exemplary application of the present invention includes a braking system having active yaw control capability. For instance, a vehicle equipped with an active yaw control capable electronically controlled hydraulic braking system would include a hydraulic control unit operatively connected to brake actuators in cooperation with wheel and tire assemblies. The hydraulic control unit and brake actuators may be constructed in a known manner such as that commonly employed on Ford Motor vehicles equipped with ABS brakes in use today.

Those skilled in the art will appreciate in view of this disclosure that wheel speed sensors 20 could comprise any of a variety of devices or systems employed in automotive vehicles for determining individual wheel speeds as well as a longitudinal velocity of the vehicle. One type of automotive speed sensor suitable for use with the present invention comprises a speed module for receiving input from multiple wheel speed sensors adapted to indicate the speed of the individual wheels. The speed module derives a longitudinal vehicle speed signal by combining the signals from the individual wheel speed sensors. One such type of speed signal module is embodied in brake control modules presently used in Ford Motor Company vehicles. The individual wheel speeds are ascertained using pulse generators disposed at each wheel.

The control module 14 may output commands to a brake controller 24 which directly commands the hydraulic control unit and indirectly controls the individual brake actuators. Those skilled in the art will appreciate in view of this disclosure that a processor within the control module and its associated peripheral equipment could be structured according to several different architectures. In a preferred embodiment, however, the processor is configured so that a control program is sequentially read for each unit command from a read-only memory (ROM) 26 which stores preset control programs. Unit commands are executed by a central processing unit (CPU) 28. The processor integrally includes an input-output control circuit (I/O) 30 for exchanging data with external devices and a random access memory (RAM) 32 for temporarily holding data while the data are being processed.

Referring back now to FIGS. 1 and 2, the present invention determines an estimate of the vehicle bank angle, $\gamma_v$, which represents the sum of the vehicle tilt, due to suspension compliance, and a road bank angle, $\gamma_R$. This is accomplished by using three separately derived bank angle estimates to determine a bias created due to lateral dynamics. One of the bank angle estimates is then compensated in accordance with this bias and then used as the final bank angle estimate, $\hat{\gamma}_{final}$. By compensating the bank angle estimate in this manner, the bank angle can be accurately estimated for most dynamic lateral conditions a vehicle will encounter in a controlled situation, improving the overall yaw control performance in common dynamic lateral events.

First, the principles of the present invention will be described so that it can be readily adopted to other types of vehicles. Using equations of motion for a rigid body the following relationship can be obtained:

$$a_y u\omega + \dot{v} g \sin(\gamma_v) \qquad (1)$$

where:
- $a_y$=lateral acceleration measured by an accelerometer on the vehicle;
- u=longitudinal velocity of vehicle;
- $\omega$=yaw rate
- $\dot{v}$=time derivative of the lateral velocity;
- g =gravitational constant; and
- $\gamma_v$=vehicle bank angle.

From this, if we assume that the time derivative of the lateral velocity, $\dot{v}$, is approximately zero, we can set $$\sin\hat{\gamma}_v \equiv \frac{a_y - uw}{g}. \qquad (2)$$

We note that there will be error, primarily due to leaving $\dot{v}$ out, however, the vehicle bank angle estimate, $\hat{\gamma}_v$, will be valid when $\dot{v}$ would otherwise be zero, e.g., lateral dynamics are steady state). This is what others have done, particularly the '658 reference.

To provide greater accuracy in determining a bank angle estimate when the lateral dynamics are not steady state, the bias introduced by this assumption must be considered.

Figure 4:
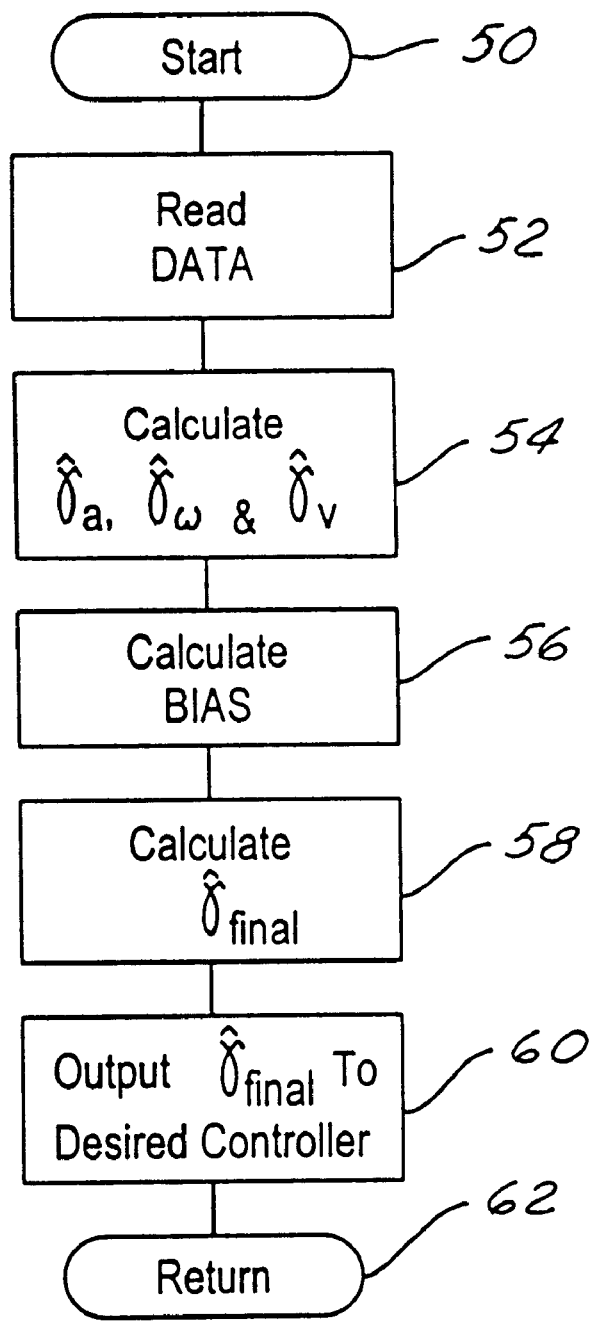
FIG. 4 is a logic flow block diagram in accordance with the present invention.

Turning now to FIG. 4, a logic flow block diagram capable of taking this bias into account in determining an estimate of the vehicle bank angle is shown and will now be further explained. At block 50 the processor starts the illustrated logic flow block diagram when the operator keys on the vehicle ignition. The processor then moves to block 52 where parameters and operating conditions of the vehicle are updated from various sensors, where the various sensors are read and their data input to the processor. If this is the first time through the algorithm all of the variables are initialized with predetermined values. The processor then steps to block 54 where three unique estimates of the vehicle bank angle, $\hat{\gamma}_a$, $\hat{\gamma}_\omega$, and $\hat{\gamma}_v$, are determined.

The first bank angle estimate, $\hat{\gamma}_a$, is determined using measured or estimated lateral acceleration data according to the following relationship:

$$\hat{\gamma}_a = A_1^{-1}(a_y - A_2\delta) \qquad (3)$$

where:
- $\hat{\gamma}_a$=a bank angle estimate based on measured lateral acceleration;
- $A_1$=a transfer function relating bank angle to vehicle lateral acceleration, where:

$$A_1 = \frac{-gL}{(L+Ku^2)}; \qquad (4)$$

- $A_2$=a transfer function relating steering wheel angle to vehicle lateral acceleration, where:

$$A_2 = \frac{Gu^2}{L+Ku^2}; \qquad (5)$$

- G=steering ratio relating actual tire angle, $\alpha$, to steering wheel angle, $\delta$;
- K=calibrated coefficient related to specific vehicle handling characteristics; and
- $\delta$=steering wheel angle.

The second bank angle estimate, $\hat{\gamma}_\omega$, is determined using measured or estimated yaw rate data according to the following relationship:

$$\hat{\gamma}_\omega = B_1^{-1}(\omega - B_2\delta) \qquad (6)$$

where:
- $\hat{\gamma}_\omega$=bank angle estimate based on measured yaw rate;
- $B_1$=a transfer function relating bank angle to vehicle yaw rate, where:

$$B_1 = \frac{gKu}{(L+Ku^2)}; \qquad (7)$$

- $B_2$=a transfer function relating steering wheel angle to vehicle yaw rate, where:

$$B_2 = \frac{Gu}{L+Ku^2}; \qquad (8)$$

The third bank angle estimate, $\hat{\gamma}_v$, is determined using measured or estimated lateral acceleration and yaw rate data in a rearranged version of Equation 2 from above, as follows:

$$\hat{\gamma}_v = \sin^{-1}\left[\frac{1}{g}(a_y - u\omega)\right] \qquad (9)$$

where:
- $\hat{\gamma}_v$=vehicle bank angle estimate based on measured lateral acceleration and yaw rate data based on the simplified equation of motion.

Once the processor has the three estimates from above, it proceeds to block 56 and calculates the bank angle BIAS due to the lateral dynamics. The processor determines the BIAS by the following equation:

$$\text{BIAS} = |DNCF| + \left|\frac{d\hat{\gamma}_v}{dt}\right| \quad (10)$$

where:
DNCF=a dynamics compensation factor, which is generally a function of the three estimates and the longitudinal velocity, which may take the following form:

$$DNCF = A_1(\hat{\gamma}_a - \hat{\gamma}_v) + uB_1(\hat{\gamma}_\omega - \hat{\gamma}_v); \text{ and} \quad (11)$$

$\frac{d\hat{\gamma}_v}{dt}$ = a numerically estimated time rate of change of the third bank angle estimate.

The processor then proceeds to block 58 where BIAS is used to account for the error introduced from simplifying Equation 1 into Equation 2. Together, DNCF and $$\frac{d\hat{\gamma}_v}{dt}$$

account for how much change in lateral dynamics, or $\dot{v}$, the vehicle maybe experiencing. Specifically, the processor uses a maximizing function that selects the maximum of two possible values to compensate the third bank angle estimate to yield a final estimate of the bank angle, $\hat{\gamma}_{final}$. This is done according to the following relationship:

$$\hat{\gamma}_{final} = \hat{\gamma}_v \times \max(0, 1 - \text{BIAS}) \quad (12)$$

In effect, this function looks at the magnitude of the BIAS—if it is greater than 1, the right side becomes negative, so the maximizing function becomes zero and $\hat{\gamma}_{final}$ is forced to zero. Alternatively—if BIAS is between 0 and 1, the right side of the maximizing function will be greater than the left side, and $\hat{\gamma}_v$ will be compensated by that value—yielding a bias corrected final bank angle estimate. Effectively, this function eliminates the possible bias, or error, introduced by eliminating $\dot{v}$ in the calculation of $\hat{\gamma}_v$. As the change in lateral dynamics grows more excessive, the final bank angle estimate becomes progressively conservative. This is a practical assumption, because a vehicle usually does not experience large lateral dynamics simultaneously with large bank angles.

The processor then proceeds to block 60 and outputs the final bank angle estimate to the brake controller 24 so that adjustments can be made in the control calculations. Finally, the processor returns through block 62 to block 52, where it will repeat the bank angle estimation process until the vehicle ignition is turned off.

Various modifications and variations will no doubt occur to those skilled in the arts to which this invention pertains. For example, the particular sensors used in conjunction with the disclosed method may be varied from those herein, as there are numerous possible methods for measuring or estimating the longitudinal velocity, yaw rate and lateral acceleration of a vehicle. Additionally, the method may be practiced with significant changes to the various transfer functions described above while remaining within the calculational and logic flow scheme described herein. Finally, it should be noted that if one desires an estimate of the lateral dynamics of equation 1$\dot{v}$, it can be calculated using the final bank angle estimate. These and all other variations which basically rely on the teachings to which this disclosure has advanced the art are properly considered within the scope of this invention as defined by the appended claims.

What is claimed is:

1. A method of detecting a bank angle for use in a yaw control system for a motor vehicle, said method comprising the steps of:
   providing a first signal corresponding to a lateral acceleration of the vehicle;
   calculating a first bank angle estimate dependent on said first signal;
   providing a second signal corresponding to a yaw rate of the vehicle;
   calculating a second bank angle estimate dependent on said second signal;
   calculating a third bank angle estimate dependent on both said first and second signals;
   calculating a bank angle bias estimate based on said first, second and third bank angle estimates; and
   calculating a final bank angle estimate as a function of said third bank angle estimate and said bank angle bias.

2. The method according to claim 1, further comprises the steps of:
   providing a third signal responsive to a sensed steering wheel angle of the vehicle; and
   calculating said first and second bank angle estimates using said third signal.

3. The method according to claim 1, wherein said second signal corresponding to said yaw rate of said motor vehicle is determined using wheel speed data.

4. The method according to claim 1, wherein said first signal corresponding to said lateral acceleration of said motor vehicle is determined using a longitudinal velocity and a steering wheel angle.

5. The method according to claim 1, wherein said function may be characterized as a product of said third bank angle estimate and a maximizing function output value having a range of between zero and one.

6. The method according to claim 1, wherein said bank angle bias estimate is determined according to the following relationship:

$$\text{BIAS} = |DNCF| + \left|\frac{d\hat{\gamma}_v}{dt}\right|$$

where:
DNCF=a mathematically derived dynamics compensation factor; and $\frac{d\hat{\gamma}_v}{dt}$ = a numerically estimated time rate of change of the third bank angle estimate.

7. The method according to claim 1, wherein said first signal corresponding to said lateral acceleration of said motor vehicle is determined using a lateral acceleration sensor.

8. A method of detecting a bank angle for use in a yaw control system for a motor vehicle, said method comprising the steps of:
   providing a first signal responsive to a sensed lateral acceleration of the vehicle;

calculating a first bank angle estimate dependent on said first signal;

providing a second signal responsive to a sensed yaw rate of the vehicle;

calculating a second bank angle estimate dependent on said second signal;

calculating a third bank angle estimate dependent on said first and second signals;

calculating a bank angle bias estimate based on said first, second and third bank angle estimates; and calculating a final bank angle estimate by as a function of said third bank angle estimate and said bank angle bias.

9. The method according to claim 8, further comprises the steps of:

providing a third signal responsive to a sensed steering wheel angle of the vehicle;

calculating said first and second bank angle estimates using said third signal.

10. The method according to claim 8, wherein said function may be characterized as a product of said third bank angle estimate and a maximizing function output value having a range of between zero and one.

11. The method according to claim 8, wherein said bank angle bias estimate is determined according to the following relationship:

$$\text{BIAS} = |DNCF| + \left|\frac{d\hat{\gamma}_v}{dt}\right|$$

where:
 DNCF=a mathematically derived dynamics compensation factor; and $\frac{d\hat{\gamma}_v}{dt}$ = a numerically estimated time rate of change of the third bank angle estimate.

12. A method of detecting a bank angle for use in a yaw control system for a motor vehicle, said method comprising the steps of:

providing a first signal corresponding to a lateral acceleration of the vehicle;

providing a second signal corresponding to a yaw rate of the vehicle;

providing a third signal responsive to a sensed steering wheel angle of the vehicle;

calculating a first bank angle estimate dependent on said first signal and said third signal;

calculating a second bank angle estimate dependent on said second signal and said third signal;

calculating a third bank angle estimate dependent on both said first and second signals;

calculating a bank angle bias estimate based on said first, second and third bank angle estimates; and calculating a final bank angle estimate as a function of said third bank angle estimate and said bank angle bias.

13. The method according to claim 12, wherein said second signal corresponding to said yaw rate of said motor vehicle is determined using wheel speed data.

14. The method according to claim 12, wherein said first signal corresponding to said lateral acceleration of said motor vehicle is determined using a longitudinal velocity and a steering wheel angle.

15. The method according to claim 12, wherein said function may be characterized as a product of said third bank angle estimate and a maximizing function output value having a range of between zero and one.

16. The method according to claim 12, wherein said second signal corresponding to said yaw rate of said motor vehicle is determined using a yaw rate sensor.

17. The method according to claim 12, wherein said first signal corresponding to said lateral acceleration of said motor vehicle is determined using a lateral acceleration sensor.

18. The method according to claim 12, wherein said bank angle bias estimate is determined according to the following relationship:

$$\text{BIAS} = |DNCF| + \left|\frac{d\hat{\gamma}_v}{dt}\right|$$

where:
 DNCF=a mathematically derived dynamics compensation factor; and $\frac{d\hat{\gamma}_v}{dt}$ = a numerically estimated time rate of change of the third bank angle estimate.

* * * * *